Figure 1:
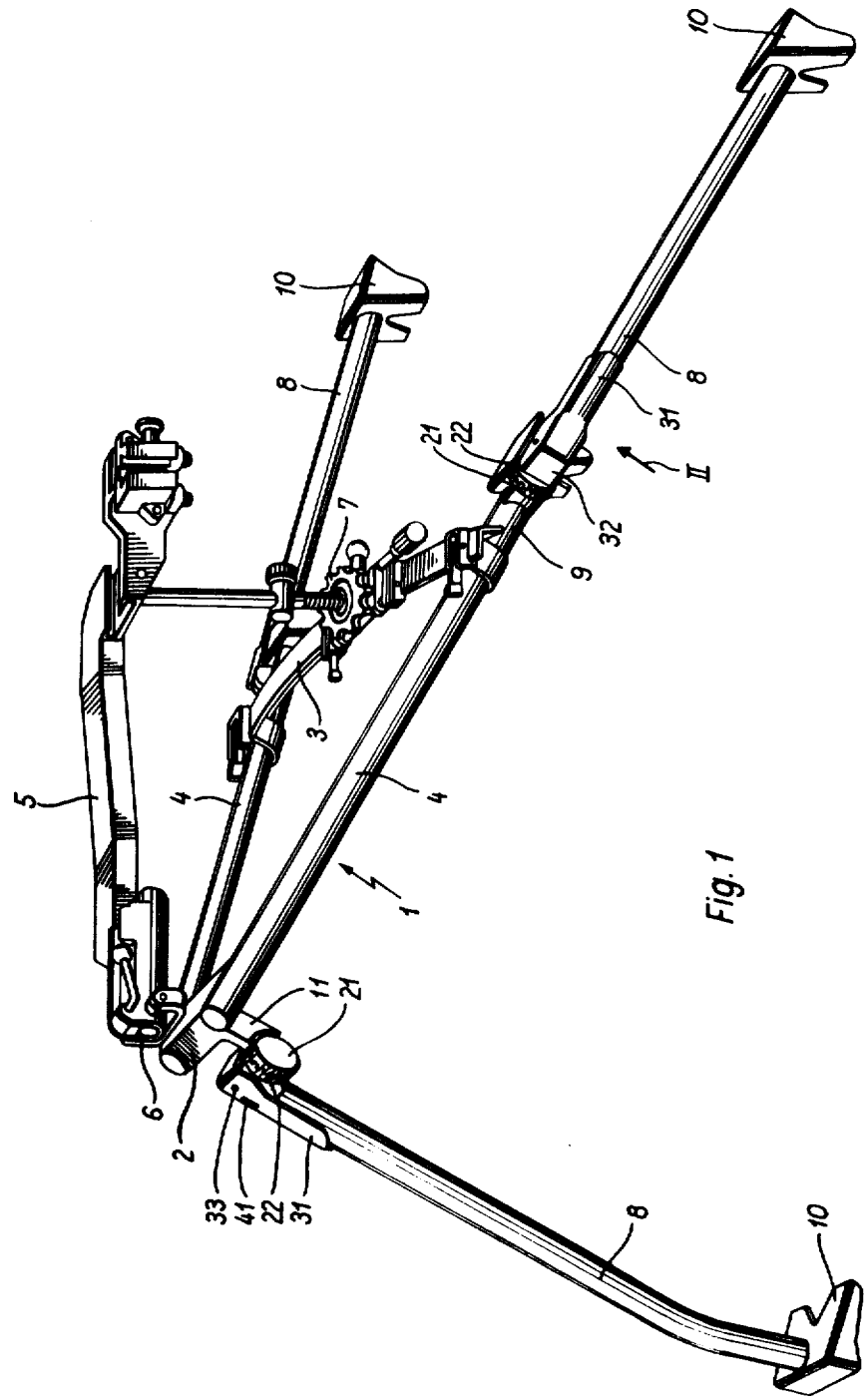

United States Patent

[11] 3,608,852

| | | | |
|---|---|---|---|
| [72] | Inventor | Kurt Horn | |
| | | Oberndorf, Germany | |
| [21] | Appl. No. | 59,058 | |
| [22] | Filed | July 29, 1970 | |
| [45] | Patented | Sept. 28, 1971 | |
| [73] | Assignee | Heckler & Koch GmbH | |
| | | Oberndorf, Germany | |
| [32] | Priority | July 30, 1969 | |
| [33] | | Germany | |
| [31] | | P 19 38 593.4 | |

[54] SUPPORT FOR LIGHT AUTOMATIC FIREARMS
8 Claims, 4 Drawing Figs.

[52] U.S. Cl. .................................................. 248/166, 42/94, 248/276, 287/14
[51] Int. Cl. ................................................. F41c 27/00
[50] Field of Search .......................................... 248/166, 434, 435, 168, 170, 188.6, 276, 278, 279, 282, 288, 291; 287/14; 42/94

[56] References Cited
UNITED STATES PATENTS

| 1,611,305 | 12/1926 | Ellwood | 248/124 X |
|---|---|---|---|
| 2,393,257 | 1/1946 | Maury | 42/94 UX |
| 2,458,950 | 1/1949 | Luzardo | 248/124 X |
| 3,312,432 | 4/1967 | Pfeiffer et al. | 248/188.6 X |

*Primary Examiner*—J. Franklin Foss
*Attorney*—Craig, Antonelli, Stewart & Hill

ABSTRACT: A tripodlike support for automatic firearms comprises a frame incorporating two divergent tubes coupled at one end by means of an angle member which member and the ends of the two tubes are provided with pivot mountings for legs which are adapted to fold to a compact structure. The legs are mounted on pivot pins associated with toothed detent members engageable by displacement of the pivot pins by means of release levers. Each release lever incorporates a displaceable stop or abutment which is adapted to be placed between the release lever and the end of the pivot pin when the lever is raised for operating purposes but which enables the release lever to lie snugly against the leg under normal service conditions thus avoiding projecting parts which might catch in obstructions or entanglements during transport under service conditions.

INVENTOR
KURT HORN

BY Craig, Antonelli, Stewart & Hill
ATTORNEYS

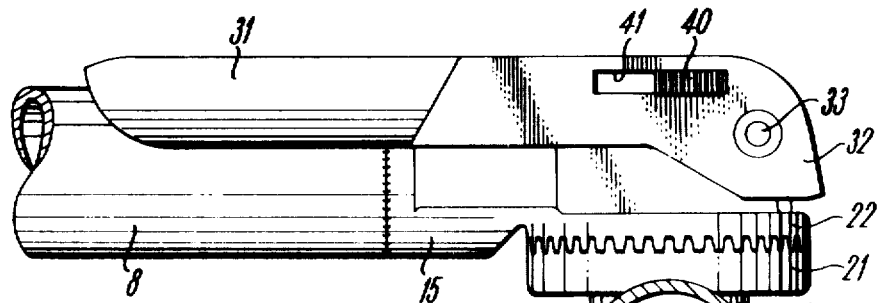
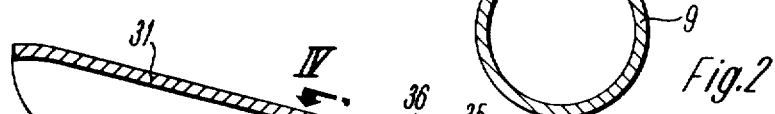
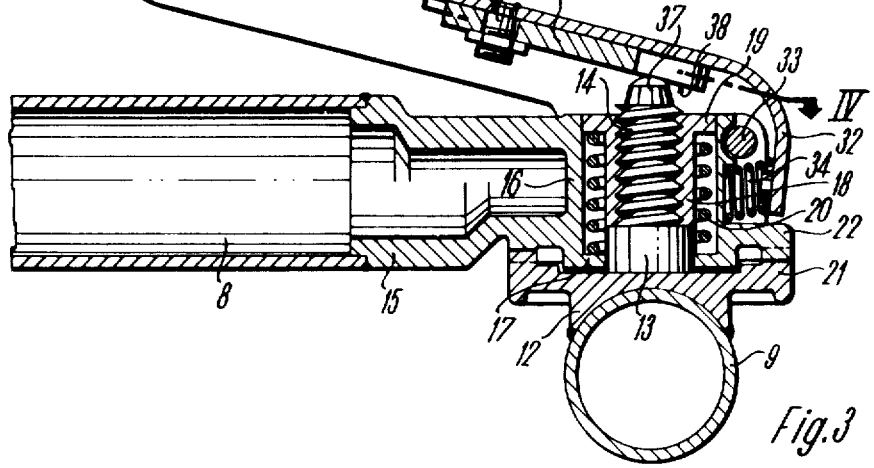
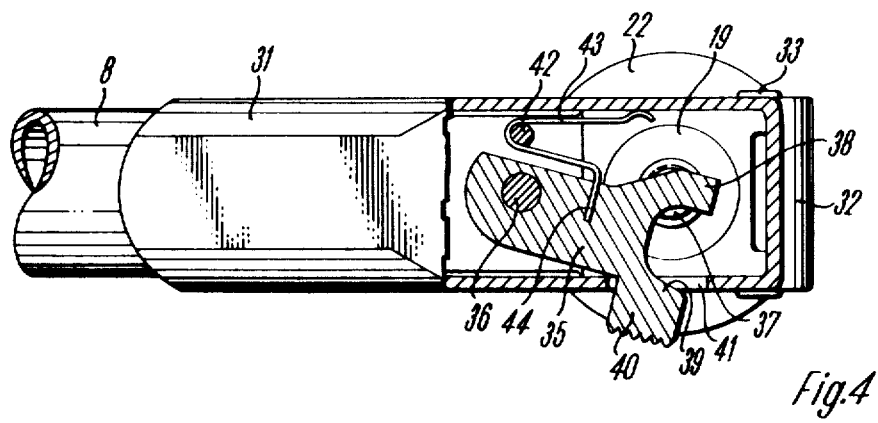
INVENTOR
KURT HORN
BY Craig, Antonelli, Stewart & Hill
ATTORNEYS

SUPPORT FOR LIGHT AUTOMATIC FIREARMS

The invention relates to a support in the nature of a tripod for light automatic firearms, such as machine guns, with pivoted legs mounted on pivots on a frame. Such a support must be foldable for practical purposes, and effective detent means are required to hold the legs in the operating positions. When the detent means are released the legs can be folded relatively to the frame of the tripod for transport. A release lever should permit a very rapid disengagement of the detent means and thereby a very rapid pivoting movement of the legs, without the secure holding of the legs in the particular position of rest and thus the stability of the tripod which is subjected to very high stresses, being adversely affected.

With the known tripods or the like of the type described the release levers stand obliquely to the legs since they bear on the end of the pivot traversing the legs and must be turned in the direction towards the leg in order that the latter can be moved around its pivot and thereby the detent means can be brought out of engagement. A serious disadvantage of the known tripods consists in the fact that this obliquely outwardly extending release lever becomes entangled only too easily in bushes or undergrowth or in wire entanglements or the like when the tripod must be carried over the ground.

Since the legs are folded as a rule in opposite directions to the frame when conveying the tripod the release levers also extend in opposite directions from the tripod so that the danger of entanglement arises independently of the direction of conveyance of the tripod and thus entanglements in obstructions is practically unavoidable. It is self-evident that the person carrying such a tripod is not only severely impeded in movement but is also liable to injury to a severe extent.

The invention is directed to the problem of avoiding these disadvantages of the known tripods without the speed and reliability of the leg adjustment and securement being adversely affected.

This object is attained according to the invention by a construction comprising a frame member, legs displaceable on said frame member, and detent means for each leg, said means including interengaging detent members on the frame and on the leg, a release lever for controlling the engagement of said detent members, an axially displaceable pivot pin connecting the frame and the respective leg and operatively connected to one of said detent members, and a displaceable abutment member on the release lever to provide selective engagement with the end of the pivot pin to permit displacement of said pivot pin and alternatively to allow the release lever to rest inoperatively against the respective leg.

By the invention the operative construction for pivoting and securement of the leg is retained but the previous disadvantage of the projecting release lever is overcome in an extremely simple way although this disadvantage appears to be a consequence of the system used, because the possibility is provided as a result of the movable stop or abutment of eliminating the operative connection between the release lever and the end of the pivot pin and thereby the possibility is provided for the release lever to rest against the corresponding leg without the pivot pin coming into engagement with the release lever.

In a preferred constructional form of the invention the release lever has a dished shape corresponding to the cross section of the leg and the movable stop is arranged compactly on the inner side of the release lever and is provided with an operating member extending through the release lever. This constructional form of the invention has the particular advantage that the release lever fits closely to the leg in its position of rest and also the movable stop provides no obstruction liable to become entangled with the tripod. Moreover the stop and the bearing for the leg are well protected against damage and accumulation of dirt as a result of the well fitting dished shape release lever.

In further development of the invention the movable stop can be loaded by means of a spring which tends to hold it in its operative position in which it lies opposite the end of the pivot pin. It is then sufficient to lift the release lever from its position of rest near the leg for the spring to move the stop in front of the end of the pivot pin and thereby to bring the release lever into the operative position. Hence in this embodiment of the invention the manipulation of the tripod according to the invention is not made more difficult and not made slower than with the known tripods, when the tripod is to be brought into the firing position, and the release lever does not necessarily have to be again folded down.

The movable stop can be constructed in the desired way, for example in the form of a slider the end of which is brought either in front of the end of the pivot pin or away from the region of this end. An operating knob passing through the release lever can be used in this case as the operating member. However a simpler arrangement than a slider running in guideways is provided by a construction in which the movable stop is a pivoted lever extending in the longitudinal direction of the release lever and pivoted about a spindle parallel to the pivot pin. Such a lever can advantageously embody a forked end opposite to the pivot pin and a lateral abutment on one of the limbs thereof which projects laterally through the release lever and forms an operating member when the other arm of the fork lies opposite to the pivot pin as an abutment. Such a lever is not only simple to install but can be swung merely by pressure on the lateral projection so that the pivot pin is disposed between the two arms of the fork when the release lever is folded on to the corresponding leg.

In an embodiment which is preferred because of its simple construction, high reliability and simple and rapid manipulation, the projection of the forked lever serving as as operating member extends through a slot in the side of the release lever and lies in its operating position with one edge against the wall part of the release lever bounding the slot. The lever is held in this position by means of a torsion spring which is arranged between the other edge of the lever and the oppositely disposed wall part of the release lever. Moreover in this embodiment of the invention the release lever is loaded by a spring which tends to press the release lever against the leg. So long as the release lever rests on the leg the end of the pivot pin lies between the arms of the fork, and one arm of the fork bears against the pivot pin by the force of the spring acting on the forked lever.

In order to bring the release lever into its operative position it is sufficient to swing the release lever away from the leg against the force of the spring acting on it so that the forked end lever can be swung into the operative position by the spring acting on it in which one arm of the fork is placed in front of the end of the pivot pin and the lateral projection on the other arm extends outwardly of the lateral slot in the release lever to form an operating member. The release lever is then operable for displacing the leg in the manner described above. If the release lever is again to be folded on to the leg it is sufficient to depress into the release lever the projection of the lever serving as a stop and standing outwardly of the release lever whereby the space between the arms of the fork is shifted in front of the end of the pivot pin so that the fork fits over the pivot pin and the spring acting on the release lever can press the latter again against the leg. Also in this case a single simple grip action is sufficient to bring the release lever again from its working position to the position of rest. Likewise the projection serving as an operating member for the lever moves substantially inwardly of the release lever so that it is no longer exposed and is not therefore likely to catch in obstructions.

In a further development of the invention the release lever can fit over the upper end face of the leg in the manner of a cap and may embody a portion forming a second lever arm and then a coil spring can be arranged between this portion of the release lever and the end face of the leg which then tends to displace the release lever into engagement with the leg.

Further details and constructions of the invention will be seen from the following description in which the invention is further described and explained on the basis of the constructional examples shown in the drawing. The features described and shown can be incorporated individually in other constructional embodiments of the invention or they can be combined as desired. In the drawings:

FIG. 1 is a perspective view of a tripod according to the invention erected ready for use, FIG. 2 is a side view of a leg in the direction of the arrow II in FIG. 1 but on a larger scale and with the leg turned through 90°, FIG. 3 is a longitudinal section through the arrangement of FIG. 2 but with the release lever swung outwardly, and FIG. 4 shows the arrangement according to FIG. 3 partly in plan and partly in section on the line IV—IV of FIG. 3.

The tripod shown in the drawing embodies a frame 1 which consists of two tubes 4 connected at one end in each case by an angle member 2 and at the other end by an arcuate aiming guide 3 on which a weapon carrier 5 is supported at its forward end by means of a fork 6 rotatably supported in the angle member 2 and at its rear end by means of an adjuster device 7 displaceably supported on the aiming guide 3 for vertical and lateral adjustment. The tripod frame 1 is carried by three legs 8 one of which is fitted to the angle member 2 and the other two are fitted to the ends 9 of the tubes 4 beyond the aiming guide 3 and so that the three legs are pivotally supported. The legs 8 are provided at their outer ends with shoes or spuds 10 which provide a good support in the ground for the tripod. As will be seen particularly from FIG. 3 the ends 9 of the tubes 4 and in like manner also the limb 11 of the angle member 2 carries in each case a bearing member 12 supporting a pivot pin 13 projecting radially from the tube end 9 and of which the outer end is provided with an external thread 14. The leg 8 embodies at its upper end a head member 15 with a bearing sleeve 16 which extends diametrically of the legs 8 and concentrically surrounds the pivot pin 13. At the end opposite to the bearing member 12 the bearing sleeve 16 has an inwardly directed flange 17 which is supported on the pivot pin 13 with a small clearance while a bushing 18 with a flange 19 is screwed on to the external thread 14 of the pivot pin and is supported with a small clearance in the upper end of the bearing sleeve 16 in the head member 15 of the leg 8.

A coiled compression spring 20 is arranged in the space between the flange 17 on the bearing sleeve 16 and the flange 19 on the bushing 18, coaxial with the pivot pin 13 and which tends to move the flanges 19 and 17 apart and consequently presses the flange 17 in the direction of the bearing member 12 at the end 9 of the frame tube 4. A toothed ring 21 is mounted on this bearing member concentrically to the pivot pin 13 and the teeth are engageable with a corresponding row of teeth 22 on the head member 15 of the leg 8. The toothed members 21 and 22 form detents which permit the leg 8 to be brought into a plurality of different angular positions relatively to the frame tubes 4 in which in each case the teeth of the rings 21 and 22 are in mutual engagement and held in engagement by the strong coiled spring 20 located coaxially of the pivot pin 13.

Displacement of the leg 8 relatively to the frame 1 is possible by swinging the leg on the pivot 13 after the teeth of the toothed rings 21 and 22 have been brought out of engagement by axial displacement of the head member 15 with the bearing sleeve 16 on the pivot pin 13. A release lever 31 is fitted to each leg 8 which permits the teeth of the rings 21 and 22 to be brought out of engagement when needed. This release lever 31 is formed by a dished pressing which fits snugly against the outer surface of the leg 8, as indicated in FIGS. 1 and 2 and embodies a portion 32 by which it fits over the upper end face of the head member 15 and thus of the leg 8. The release lever 31 is supported on a pivot 33 fitted to the head member 15 of the leg 8 in the region between the bearing sleeve 16 and the end face of the bearing sleeve and extends transversely to the longitudinal axis of the leg and transversely to the axis of the bearing sleeve 16. A coil spring 34 is arranged between the end face of the head member 15 and the portion 32 of the release lever fitting over this end face in the manner of a cap, and this spring tends to displace the release lever 31 in the counterclockwise direction of FIG. 3 and thereby to press the release lever against the leg 8.

A lever 35 is pivotally supported on a pin 36 on the inner side of the release lever 31 which extends mainly in the longitudinal direction of the release lever from the pin 36 in the direction towards the pivot axis of the release lever formed by the pin 33 and of which the free end is located in the region of the exposed end 37 of the pivot pin 13 projecting from the head 15 of the leg 8, The free end of the lever 35 supported on the release lever 31 is of forked construction and one arm 38 lies opposite the pivot pin 13 when the lever is in its working position. In this position a projection 40 on the other arm 39 of the fork extends through a slot 41 in the sidewall of the release lever 31 and serves as an operating member by which the lever 35 can be brought with a pivoting movement to its center position in which the exposed end 37 of the pivot pin 13 lies between the two arms 38 and 39 of the forked end of the lever.

As will be apparent from FIG. 4 the lever 35 can be pressed inwardly by simple pressure on the preferably roughened or toothed end part of the projection with an anticlockwise movement. On the inner side of the dished release lever 31 there is provided a torsion spring 43 supported on a pin 42 which bears at one end on the inner side of the release lever 31 and has a curved end part 44 which engages a corresponding hole on the side of the forked lever 35 opposite to the projection 40 and tends to hold this lever in the operative position shown in FIG. 4 in which the fork arm 38 lies opposite the end 37 of the pivot pin 13 and the projection 40 on the other fork arm 39 serving as an operating member projects outwardly of the slot 41 in the release lever 31. In this position the edge of the lever 35 incorporating the projection 40 bears against the inner side of the dished release lever 31 as clearly indicated on FIG. 4.

When the lever 35 adopts the operating position described with reference to FIG. 4 in which one arm 38 of the lever 35 is located in front of the exposed end 37 of the pin 13, the release lever 31 is at an angle to the leg 8, as indicated on FIG. 3. If now the release lever 31 is pressed down towards the leg 8 the arm 38 of the lever 35 now operating as an abutment depresses the end 37 of the pivot pin 13 and thus depresses this pivot pin together with the bushing 18 against the action of the coil spring 20 and moves it outwardly of the bearing sleeve 16 on the head member 15 of the leg 8 by an amount which is greater than the depth of the teeth on the rings 21 and 22 so that these teeth are disengaged and the leg 8 can be swung freely around the pivot pin 13 until, in the desired position, the release lever 31 is again released and the teeth of the rings 21 and 22 are brought into engagement by the coil spring 20 surrounding the pivot pin 13 and are then held securely in engagement.

If after displacement of the leg 8 the lever 35 supported in the release lever 31 is again brought to the said mid position by pressure on the projection 40, the abutment formed by the fork arm 38 is located by the side of the exposed end 37 of the pivot pin 13 and this end of the pivot pin enters the gap between the two fork arms. The release lever is then free so that the spring 34 acting on the caplike portion 32 moves it in the counterclockwise direction in FIG. 3 and it can then rest against the leg 8 so that it adopts the position shown in FIGS. 1 and 2.

If the release lever 31 is again to be brought into the working position from this position of rest it is sufficient to pull out the release lever 31 away from the leg 8 to the position shown in FIG. 3 whereupon the torsion spring 43 returns the lever 35 to the operating position shown in FIG. 4 in which the fork arm 38 forms an abutment in front of the end 37 of the pivot pin 13. Further the use of such a pivot lever as an abutment is very simple and is moreover protected against dirt and damage by reason of the dished construction of the release lever 31.

It should be understood that the invention is not limited to the constructional example described but changes are possible without departing from the scope of the invention. In particular the invention is not limited to the particular construction of the bearing and catch means for the legs on the tripod frame. Furthermore for example the release lever may also have another appropriate shape, for example it may be of rod or bar shape accommodated in its position of rest in a depression in the leg and the movable abutment could for example consist of a slideable member in place of a lever.

What we claim is:

1. Tripodlike support for firearms comprising a frame member, legs displaceable on said frame member, and detent means for each leg, said means including interengaging detent members on the frame and on the leg, a release lever for controlling the engagement of said detent members, an axially displaceable pivot pin connecting the frame and the respective leg and operatively connected to one of said detent members, and a displaceable abutment member on the release lever to provide selective engagement with the end of the pivot pin to permit displacement of said pivot pin and alternatively to allow the release lever to rest inoperatively against the respective leg.

2. A tripodlike support according to claim 1 in which the release lever is of dished shape to fit snugly against the leg and the displaceable abutment member is arranged on the inner side of the release lever and is provided with an operating member adapted to pass through an opening in said lever.

3. A tripodlike support according to claim 2, in which the abutment member is subjected to the action of a spring which tends to hold it in its operative position in which it lies opposite the end of the pivot pin.

4. A tripodlike support according to claim 2, in which the abutment member forms part of a lever extending in the longitudinal direction of the release lever and supported on a pivot approximately parallel to the said pivot pin.

5. A tripodlike support according to claim 4, in which the abutment member embodies a forked end adjacent to the pivot pin, and a lateral projection on one of the fork arms projects laterally of the release lever to serve as an operating member when the other fork arm is in engagement with the pivot pin.

6. A tripodlike support according to claim 5, in which the said projection passes through a lateral slot in the release lever and in its operative position bears against a wall part of the release lever bounding the slot, in which position it is held by means of a torsion spring located between the other edge of the abutment member and the wall part of the release lever lying opposite to it.

7. A tripodlike support according to claim 1, in which the release lever is controlled by a spring which tends to press the lever into contact with the leg.

8. A tripodlike support according to claim 7, in which the release lever is provided with an angled end portion which fits in the manner of a cap over the end face of the leg and a coil spring is arranged between this portion of the lever and the end face of the leg.